March 15, 1966     H. C. GRANT, JR     3,240,964
STEPPING MOTOR

Filed May 2, 1963     3 Sheets-Sheet 1

INVENTOR
HARRY C. GRANT, JR.
ATTORNEY

March 15, 1966    H. C. GRANT, JR    3,240,964
STEPPING MOTOR

Filed May 2, 1963    3 Sheets-Sheet 3

INVENTOR
HARRY C. GRANT, JR.
BY
ATTORNEY

United States Patent Office 3,240,964
Patented Mar. 15, 1966

3,240,964
STEPPING MOTOR
Harry C. Grant, Jr., Ridgewood, N.J., assignor to Specialties Development Corporation, Belleville, N.J., a corporation of New Jersey
Filed May 2, 1963, Ser. No. 277,527
3 Claims. (Cl. 310—49)

The present invention relates to motors for rotating a shaft, and, more particularly, to an improved motor for rotating a shaft stepwise and indexing the shaft while at rest, such a motor being generally referred to herein as a stepping motor.

Accordingly, an object of the present invention is to provide such a motor which has a single main bearing and has no other moving parts in frictional engagement.

Another object is to provide such a motor which is devoid of mechanical devices.

Another object is to provide such a motor which can be operated constantly for long periods without overheating or requiring servicing or repair.

A further object is to provide such a motor which is simple and economical in construction and is reliable in operation.

Other and further objects of the invention will be obvious upon an understanding of the illustrative embodiment about to be described, or will be indicated in the appended claims, and various advantages not referred to herein will occur to one skilled in the art upon employment of the invention in practice.

A prefered embodiment of the invention has been chosen for purposes of illustration and description, and is shown in the accompanying drawings, forming a part of the specification, wherein.

Figure 1:
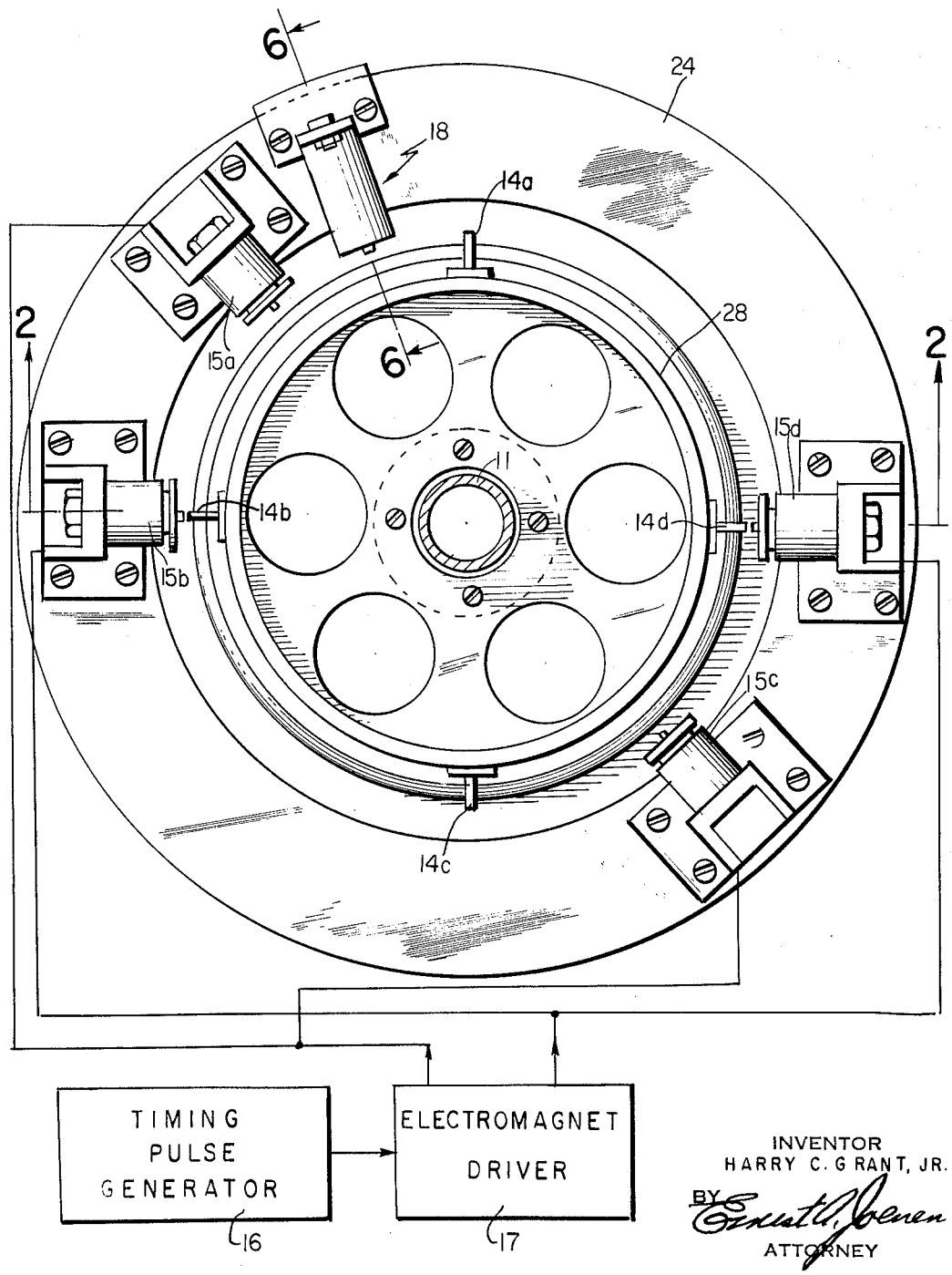
FIG. 1 is a plan view of a stepping motor in accordance with the present invention and a simplified block diagram of an arrangement for effecting stepwise rotation of the motor.

Referring now to the drawings in detail, a stepping motor is shown which generally comprises a frame 10, a rotatable shaft 11, motor means 12 for constantly applying torque to the shaft to urge rotation thereof, a plurality of armatures 14 ($a$ to $d$) on the shaft, a plurality of electromagnets 15 ($a$ to $d$) on the frame for cooperation with the armatures 14, and an arrangement for controlling energization and de-energization of the electromagnets 15 for example a timing pulse generator 16 and an electromagnet driver 17. A motion sensing device 18 for cooperation with the armatures, and an alarm arrangement including an alarm 19 and a loss of motion sensing network 20 under the control of the device 18 for operating the alarm may be provided for certain uses of the stepping motor.

Figure 2:
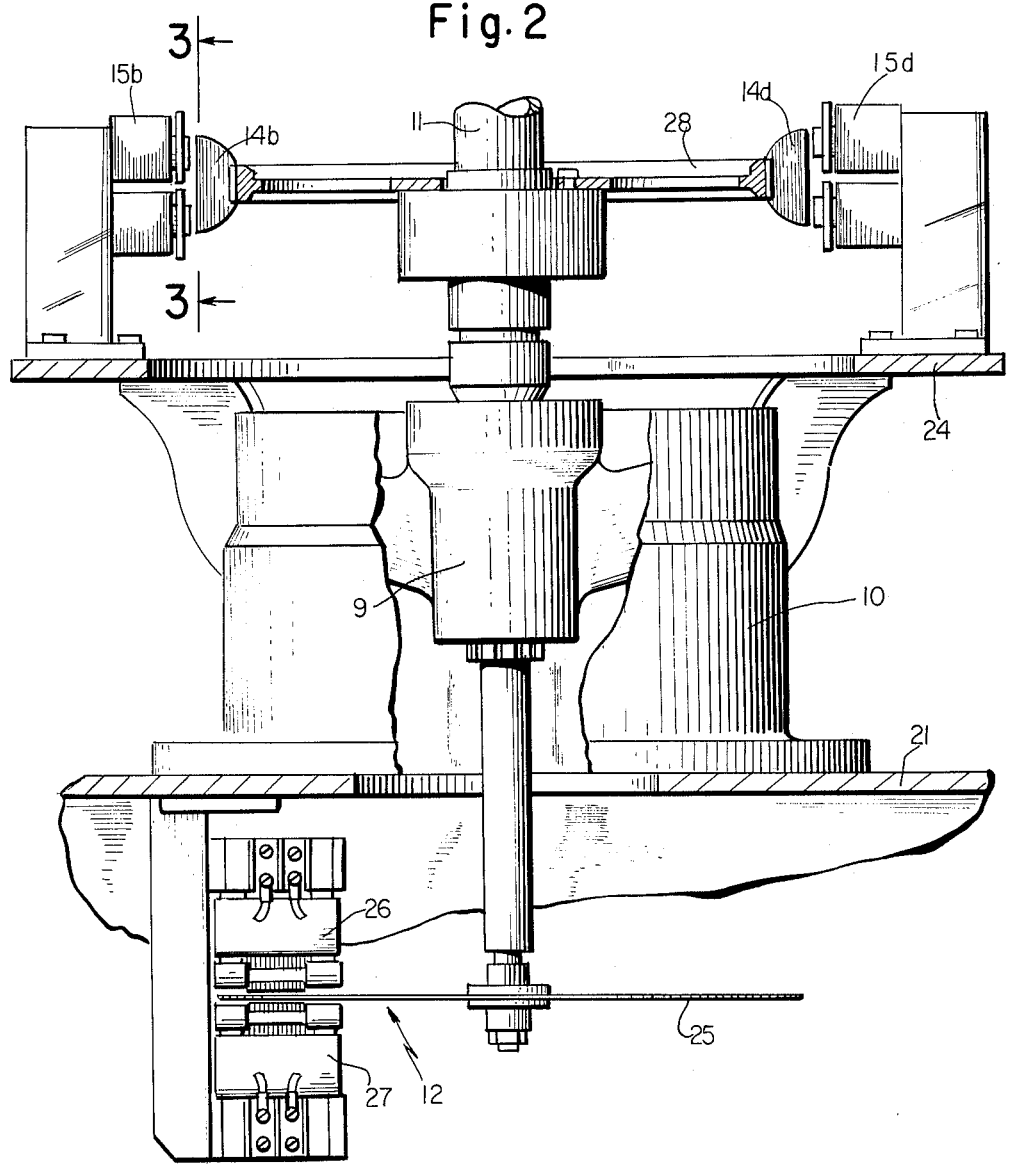
FIG. 2 is a sectional view taken along the line 2—2 on FIG. 1.

As shown in FIG. 2, the frame 10 includes a lower ring 21, a spider 22 having a housing 9 for a bearing (not shown) in which the shaft 11 is rotatably supported, and an upper ring 24 on which the electromagnets 15 and the motion sensing device 18 are mounted. The shaft bearing is the only bearing required.

The torque applying motor means 12 is of the type which has no contacting sliding parts or bearings. As shown herein, such means comprise a large flat metallic disc 25 secured to the lower end of the shaft 11 for rotation therewith, and opposed upper and lower induction coils 26 and 27 depending from the lower ring 21 of the frame 10 and being spaced apart to allow an outer annular zone of the disc 25 to pass therebetween.

Preferably, the disc 25 is formed of copper, has a diameter of about nine inches and a thickness of about 0.032, and is absolutely flat. The cores of the opposed coils 26 and 27 are spaced apart about 0.060 inch and the clearance between each side of the disc and the core adjacent thereto is about 0.015 inch. In practice a sufficient torque can be applied to the shaft 11 to rotate the same by such a motor at a power consumption of about 60 kw.

Alternatively, air or liquid driven motor means 12 could be utilized where air or liquid under pressure is available.

The armatures 14 are spaced evenly circumferentially on the shaft 11 and extend radially outwardly from a wheel 28 secured to the upper portion of the shaft. The electromagnets are arranged in a circular zone on the upper ring 24 of the frame which zone is concentric with the axis of rotation of the shaft adjacent the path of the outer ends of the armatures.

Any suitable number of armatures 14 and electromagnets 15 may be utilized to provide any desired number of steps by circumferentially spacing the armatures and electromagnets and energizing and de-energizing the electromagnets as required to step the shaft 11.

In the illustrative embodiment, four armatures 14 designated 14$a$, 14$b$, 14$c$, and 14$d$ and at least four electromagnets 15 designated 15$a$, 15$b$, 15$c$ and 15$d$ are provided. In such an arrangement the armatures are spaced 90° apart, the electromagnets 15$a$, and 15$c$, and 15$b$ and 15$d$ are diametrically opposite each other and the electromagnets 15$a$, and 15$b$, and 15$c$ and 15$d$ are spaced apart 45°, that is, half the distance the armatures are spaced. The opposed electromagnets maintain the rotary structure in static balance to minimize bearing load.

By using four armatures, the motor has eight steps per revolution that is, twice the number of steps as there are armatures. However, by increasing the number of armatures in twos the motor can be arranged to provide 12, 16, 20, 24 . . . 40, 44, 48, etc. steps per revolution. In any of such arrangements, the electromagnets 15$a$, 15$b$ and 15$c$, 15$d$ are spaced apart half the distance the armatures are spaced apart to maintain the rotary structure in static balance.

Stepwise rotation of the shaft 11 is effected by constantly applying a torque thereto; and utilizing the cooperating electromagnets and armatures as brakes to stop, index and hold the shaft and then release the shaft for further rotation by alternately energizing and de-energizing the electromagnets at timed intervals. This is accomplished, for example, by the timing pulse generator 16 which pulses the brake or electromagnet driver 17 once every five seconds and causes the driver to energize and de-energize the electromagnets for a desired duration. A suitable electronic network for controlling the electromagnets is disclosed in detail in copending U.S. patent application Serial No. 260,007, filed February 20, 1963, in which applicant is a joint inventor.

Figures 3, 5:
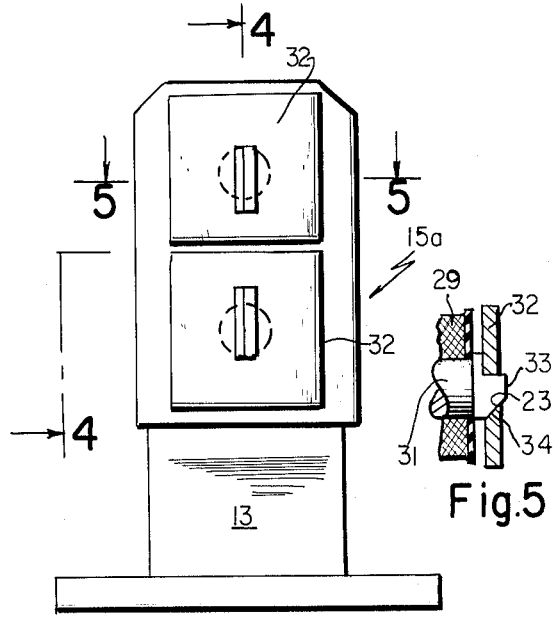
FIG. 3 is an enlarged elevational view of an electromagnet as seen along the line 3—3 on FIG. 2.
FIG. 5 is a sectional view taken along the line 5—5 on FIG. 3.
Figure 4:
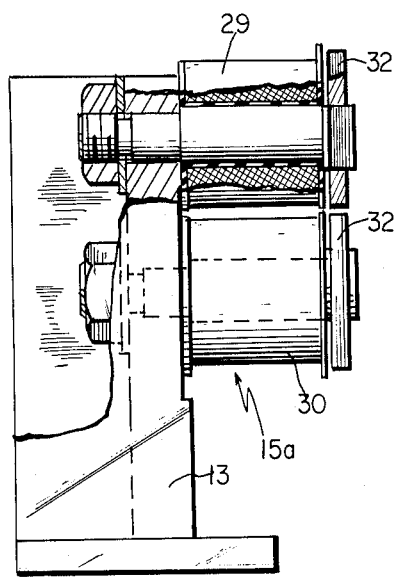
FIG. 4 is a stepped sectional view taken along the line 4—4 on FIG. 3.

An important feature of the present invention is construction of the electromagnets 15. For example, as shown in FIGS. 3, 4 and 5, the electromagnets comprise upper and lower coils 29 and 30, a pole 31 extending through each coil, and facing the outer faces of the armature (FIGS. 1 and 2), and a short circuit coil 32 mounted on the end of each pole facing the armatures.

These ends of the poles are rectangular and have a vertical surface 33 parallel to the outer faces of the armatures and a vertical surface 34 slanted outwardly from the surface 33 in the direction in which the armatures move. The other ends of the poles are supported on a mounting bracket 13 formed of the same material as the poles, for example cold rolled steel, whereby a horseshoe type magnet is provided.

The coils 32 are rectangular and have an opening 23 therein for receiving the ends of the poles so that the surface 33 extends therethrough and the surface 34 partially extends therethrough. The coils 32 are formed of copper having a low electrical resistance, and the lower edge of the upper coil 32 is closely adjacent the upper edge of the lower coil 32.

When the armature approaches an energized electromagnet which is constructed and arranged as just described, the armature induces a current in the short-circuit coils 32 to create a flux which lags the flux of the electromagnets. However, just as the armature passes the poles it induces a current in the coils 32 to create a flux which increases the flux and effective pull of the electromagnets. The magnitude of this pull is effective to overcome the torque applied on the shaft 11 to rotate the armature, whereby the electromagnet pulls back the armature and holds it until the electromagnet is de-energized. In this manner, the armatures are prevented from riding past the electromagnets without being stopped to index the shaft 11.

Figure 6:
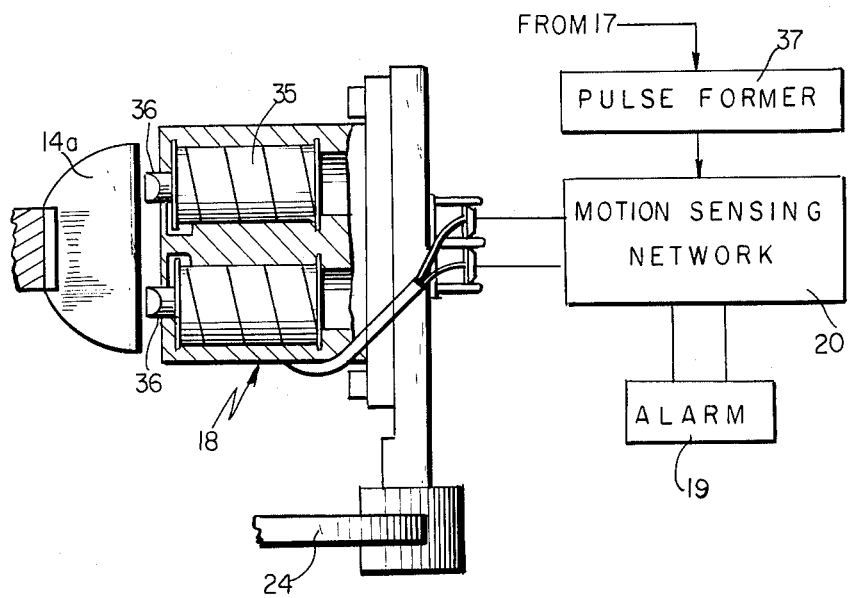
FIG. 6 is an enlarged sectional view taken along the line 6—6 on FIG. 1 illustrating a motion sensing device and a simplified block diagram of an arrangement for giving an alarm upon stoppage of the motor.

As shown in FIG. 6, the motion sensing device 18 includes a pair of coils 35 and a core for each coil 36 which is adjacent to the path of the armatures 14 so that, in cutting the flux of the coil, a pulse signal is produced at least every ten seconds. This pulse is fed into the motion sensing network 20 into which a pulse is also fed from a pulse former 37 every ten seconds.

While the shaft is rotated stepwise properly, the pulse generated by the device 18 cancels the pulse of the pulse former and nothing occurs. However, should the device 18 fail to generate such a cancelling pulse when due, the pulse former actuates the sensing network to effect operation of the alarm.

A suitable electronic network for controlling the alarm in the foregoing manner is disclosed in detail in the aforementioned patent application.

As various changes may be made in the form, construction and arrangement of the parts herein, without departing from the spirit and scope of the invention and without sacrificing any of its advantages, it is to be understood that all matter herein is to be interpreted as illustrative and not in any limiting sense.

I claim:

1. In a stepping motor, the combination of a rotatable drive shaft, motor means for constantly applying torque to said shaft to urge rotation thereof, a plurality of radially extending armature means spaced circumferentially on said shaft and having free ends arranged to travel in a circular path, a plurality of fixed electromagnetic means each having a pole provided with a free end arranged in an adjacent circular zone concentric with and in substantially the same plane as the circular path for creating an electromagnetic field between the zone and the path to cause said pole to attract said armature means, short-circuit coil means surrounding said pole adjacent the free ends thereof and arranged to expose the free ends of said pole to cause a current to be induced in said coil means as said armature means approaches said pole which current lags the flux of the magnetic field and to cause a current to be induced in said coil means as said armature means passes said pole which current increases the flux of the magnetic field and means for energizing and de-energizing said electromagnetic means.

2. In a stepping motor according to claim 1, wherein the free ends of said armature means extend outwardly and the free ends of said pole extend inwardly.

3. In a stepping motor according to claim 1, wherein said electromagnetic means include an upper pole and a lower pole, and said armature means are arranged to be attracted by both the upper and lower poles.

References Cited by the Examiner

UNITED STATES PATENTS 2,765,433  10/1956  Lilienstein _____ 310—49

ORIS L. RADER, *Primary Examiner.*